United States Patent [19]

Krude

[11] Patent Number: 4,540,385
[45] Date of Patent: Sep. 10, 1985

[54] DRIVE SHAFT ASSEMBLY

[75] Inventor: Werner Krude, Siegburg, Fed. Rep. of Germany

[73] Assignee: Uni-Cardan Aktiengesellschaft, Siegburg, Fed. Rep. of Germany

[21] Appl. No.: 544,460

[22] Filed: Oct. 21, 1983

[30] Foreign Application Priority Data

Oct. 22, 1982 [DE] Fed. Rep. of Germany ....... 3239075

[51] Int. Cl.$^3$ ........................... F16D 3/26; F16C 1/02
[52] U.S. Cl. .................................... 464/113; 464/111; 464/112; 464/140; 464/181; 464/182; 464/183
[58] Field of Search .............................. 464/111–119, 464/140, 179, 181, 182, 183; 138/108, 109

[56] References Cited

U.S. PATENT DOCUMENTS

| 3,490,251 | 1/1970 | Roethlisberger | 464/113 X |
| 4,279,275 | 7/1981 | Stanwood et al. | 464/181 X |
| 4,325,174 | 4/1982 | Smith et al. | 464/181 X |
| 4,362,521 | 12/1982 | Puck et al. | 464/181 |
| 4,451,245 | 5/1984 | Hornig et al. | 464/181 |

FOREIGN PATENT DOCUMENTS

| 22467 | 1/1981 | European Pat. Off. |
| 1979966 | 7/1966 | Fed. Rep. of Germany . |
| 1599292 | 9/1981 | United Kingdom . |

Primary Examiner—John Petrakes
Attorney, Agent, or Firm—Toren, McGeady, Stanger, Goldberg & Kiel

[57] ABSTRACT

A drive shaft assembly particularly for use in driving the wheels of a motor vehicle having a first universal joint and a second universal joint with an intermediate shaft interconnecting the two joints, the intermediate shaft being made of fiber reinforced plastic material and being formed integrally with a component of at least one of the universal joints.

10 Claims, 3 Drawing Figures

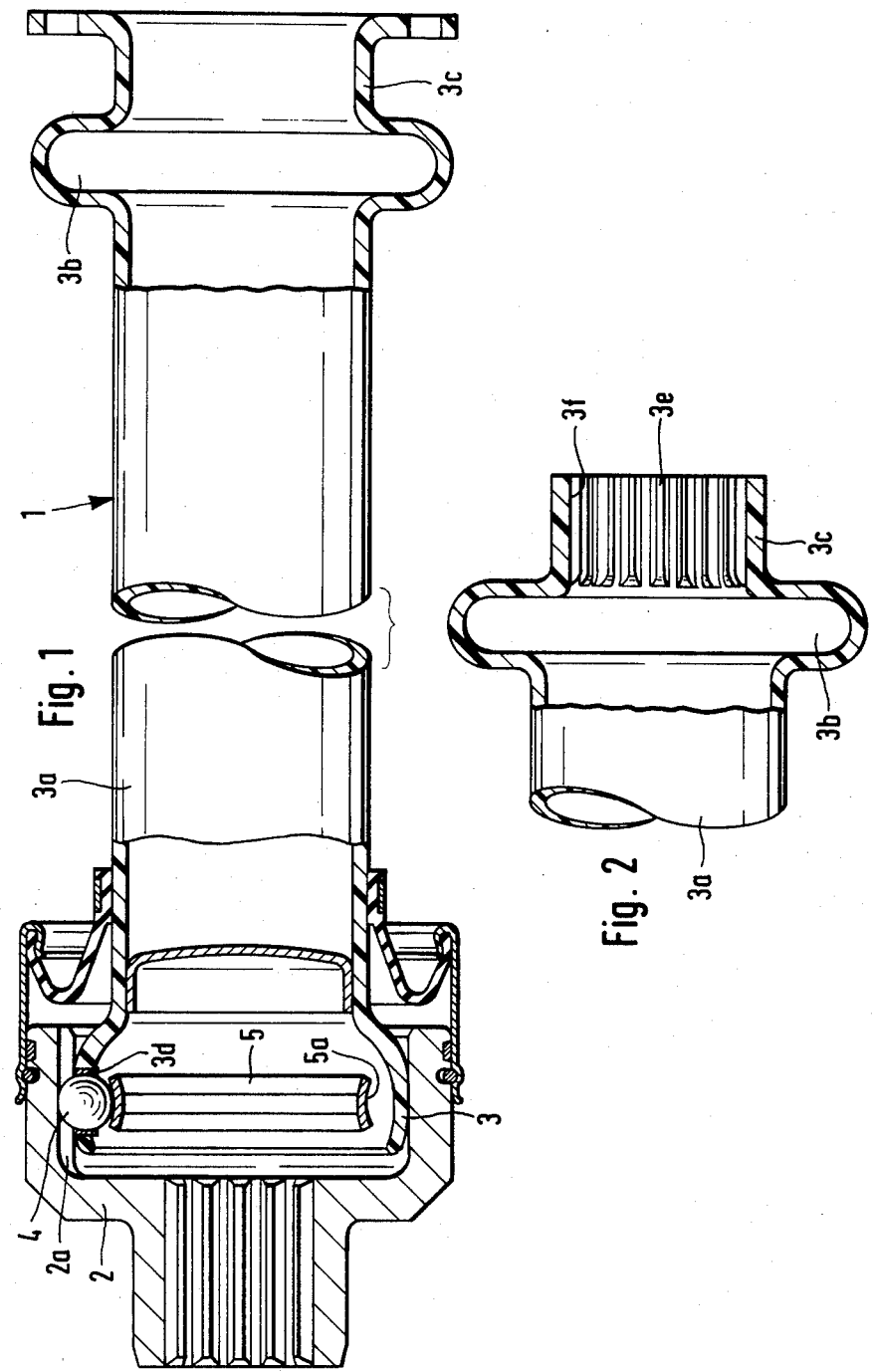

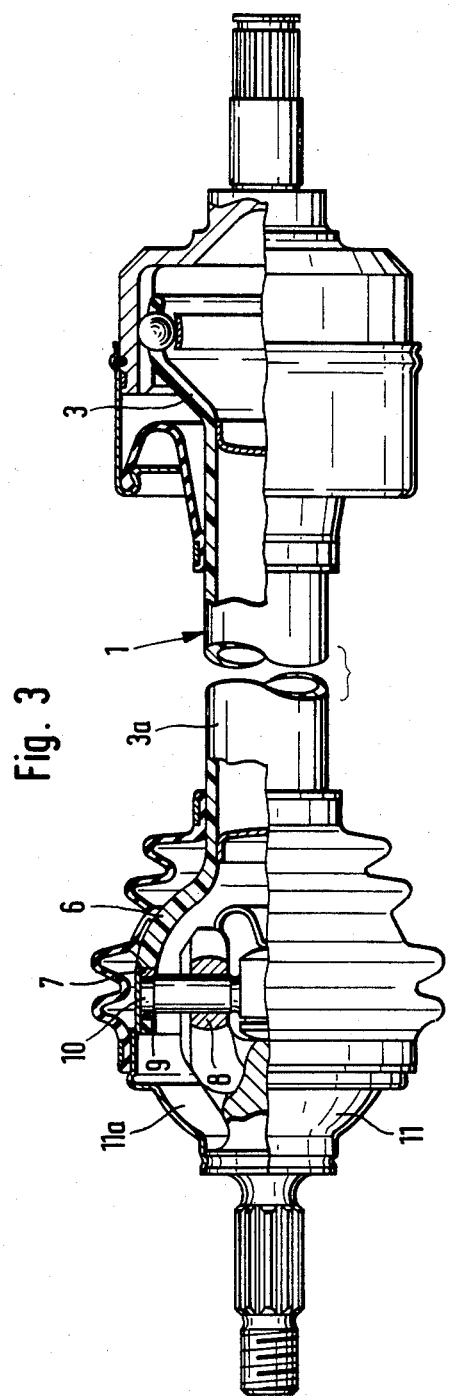

DRIVE SHAFT ASSEMBLY

The present invention relates generally to driving assemblies and more particularly but not exclusively to an assembly for driving the wheels of a motor vehicle. Generally, the type of assembly to which the present invention relates will include a first universal joint, a second universal joint and an intermediate shaft connecting the two universal joints in driving engagement.

Normally, it is an important object in the design of motor vehicles to optimize the driving characteristics of the vehicle, such as speed, and to minimize the fuel consumption. It is known that one way for minimizing the fuel consumption involves maintaining vehicle weight as low as possible. Reduction of weight can be accomplished quite often by substituting lighter materials for heavier materials. One way in which this may be achieved is by incorporating components of fiber reinforced plastic material where formerly conventional metallic components had been used. Many proposals have been made for component designs of composite or plastic materials and one example of this is German Utility Model No. 1979966 wherein it is proposed to produce a universal joint made of plastic material formed as a single unitary component. The joint may comprise a layered thermoplast, for example polypropylene and in connection with this known design it is also proposed to provide in the plastic tube in the joint area a ribbed design with the rib diameter being greater than the laterally adjoining hubs of the plastic tube itself.

While it may be that such a proposal would operate to reduce vehicle weight and consequently reduce fuel consumption it would appear that a Cardan joint consisting of thermoplastic material or the like would have a relatively short service life under permanently high dynamic loading conditions.

A further proposal relating to the field of the invention is set forth in European Patent Application No. 22,467 wherein there is disclosed a process for producing a drive shaft made of a composite fiber material for coupling two different transmission elements. The drive shaft may be made of a composite fiber reinforced plastic material having fibers wound at a helix angle of approximately 45° relative to the axis of the shaft. The shaft may incorporate a flexible coupling component in the form of a fold whose diameter is greater than that of the shaft which is also produced by winding of fibers. However, it remains necessary to join the shaft and the coupling thus produced to other transmission elements and this becomes expensive during production and may to a large extent eliminate the weight reduction features achieved by use of this composite component.

British Patent No. 1 599 292 discloses a drive shaft of composite fiber reinforced plastic material with a Hookes type universal joint in which one pair of bearing bushes receiving opposed arms of trunion cross of the joint is received directly in a reinforced end portion of the composite shaft. This construction is also expensive to produce because the bearing bushes must be incorporated in the structure of the shaft during manufacture thereof by winding since otherwise the shaft would be weakened.

In view of the disadvantages of prior art proposals, the present invention is directed toward providing a relatively light-weight drive shaft assembly which is of simple design and which is economical to produce and manufacture.

SUMMARY OF THE INVENTION

Briefly, the present invention may be described as a drive shaft assembly especially useful for driving the wheels of a motor vehicle comprising a first universal joint, a second universal joint and an intermediate shaft interconnecting said two universal joints, the intermediate shaft being made of a fiber reinforced plastic material which is constructed to be integral with a component of at least one of the universal joints.

The invention may be embodied in several different ways. For example, at least one of the universal joints may comprise an outwardly extending fold or bellows formation formed in the intermediate shaft. At least one of the universal joints may comprise a constant velocity universal joint having a member thereof integrally formed with the intermediate shaft.

The constant velocity universal joint may be a tripode joint having a tripod element with its limbs connected at their outermost ends to the intermediate shaft. Alternatively, the constant velocity joint may comprise an outer joint member having internal grooves, a plurality of balls received in each groove and occupying apertures in an end portion of the intermediate shaft with the balls supporting each other against inward movement or being supported by a support member arranged inside the end portion of the shaft.

Where the universal joint is a tripode joint, the outermost ends of the limbs of the tripod element thereof may be received in apertures, bores or similar formations in the intermediate shaft.

Such apertures or bores or the apertures in the end portion of the intermediate shaft where the universal joint is one which incorporates balls, may be provided with metallic bushes which receive the balls or the bearing journals of the tripod element.

When the universal joint comprises an outwardly extending fold in the intermediate shaft, such fold may run into a connecting part in the form of a flange or a tubular part having splines for connection with another torque transmitting element.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWINGS

In the drawings:

FIG. 1 is a view partially broken away and partially in section showing one embodiment of a drive shaft assembly in accordance with the invention;

FIG. 2 is a sectional view through another embodiment of an assembly in accordance with the invention; and FIG. 3 is a partially sectioned view of still a further embodiment of a drive shaft assembly in accordance with the invention.

DETAILED DESCRIPTION OF THE PREFERRED EMBODIMENTS

Referring now to the drawings, wherein similar reference numerals are used to identify like parts in each of the figures thereof, and referring first to FIG. 1, there is shown a drive shaft assembly 1 structured in accordance with the invention and formed at one end with a universal joint having an outer joint member 2 and an inner joint member 3, the inner joint member 3 being formed by an end portion of an enlarged diameter section of an intermediate shaft 3a.

The outer joint member 2 of the universal joint is provided with longitudinally extending grooves 2a on the interior thereof, with one of a plurality of balls 4 being received in each of the grooves. The inner joint member 3 formed integrally with the intermediate shaft 3a has therein a plurality of apertures 3d and the balls 4 are received in the apertures 3d formed in the end of the intermediate shaft. The balls are supported against inward movement by a support member 5 having an annular configuration and formed with an external support surface 5a which is concave as seen in the longitudinal section of the assembly shown in FIG. 1. The balls are supported within bushes provided in the apertures 3d of the inner joint member 3.

The intermediate shaft 3a and its end portion forming the inner joint member 3 are composed of glass fiber and/or carbon fiber reinforced plastic material. The outer joint member 2 of the universal joint may be of steel or cast iron as is conventional for universal joints or it may itself be formed of fiber reinforced plastic material.

At the opposite end of the intermediate shaft 3a there is provided a second universal joint 3b which is structured in the form of an outwardly extending fold formed in the shaft. Beyond this there is a connecting portion 3c which extends into an apertured flange for enabling the assembly to be bolted to a torque transmitting component. The parts 3b and 3c are formed integrally with the shaft 3a and are also made of fiber reinforced plastic material.

With a suitable construction and orientation of fibers, fold 3b is capable of torque transmission up to a certain angle of articulation.

Referring now to FIG. 2, there is shown another embodiment of the invention which comprises a modification of the portion 3c and of the flange shown at the end of the intermediate shaft 3a forming the drive assembly of FIG. 1. In the embodiment depicted in FIG. 2, the intermediate shaft is formed with a fold 3b which acts as a universal joint and extending from this fold is a tubular portion 3c having an internal surface 3f which is provided with longitudinally extending splines 3e. These splines operate to effect a torque transmitting connection with a male shaft member which may be fitted into the portion 3c and which will also have external splines adapted to engage with the splines 3e. The splines 3e are also formed integrally with the fiber reinforced plastic material of the intermediate shaft 3a and with the fold forming the universal joint 3b at the end thereof.

In FIG. 3 there is shown a further embodiment of the invention wherein a drive shaft assembly 1 is formed with an intermediate shaft 3a of fiber reinforced plastic material which has at its right end a universal joint of the type shown in FIG. 1. At the left end of the assembly shown in FIG. 3, there is provided a tripode joint having a tripod element with limbs or journals 10 having outer ends which are received in circumferentially spaced bores or apertures 9 provided in an end portion 6 of the intermediate shaft 3a. Bushes 7 are provided in the bores or apertures 9 and the journals 10 receive spherical or truncated rolling elements 8 which engage between fingers 11a of a joint member 11.

The universal joints formed at both ends of the intermediate shaft are provided with sealing boots for lubricant retention as is usual for such universal joints.

It will be appreciated that universal joints of other types may be used with an intermediate shaft formed of fiber reinforced plastic material.

Thus, it will be seen that the present invention provides a relatively light-weight drive shaft which has a rather simple design composition and which avoids the need for a large number of connecting areas or parts as a result of which a careful selection of material and joint combinations may be provided to ensure long service life. Because of the special design of the intermediate shaft, it is capable of transmitting relatively high torques and of accommodating joint angles of a defined size.

The objectives of the invention are essentially achieved in that the intermediate shaft is formed integrally with at least one of the components of the joints. The universal joints may be constant velocity joints utilizing balls for torque transmission, tripod joints or they may be constituted by an outwardly extending fold integral with the intermediate shaft.

A drive shaft assembly in accordance with the present invention will have a number of significant advantages. First of all, as previously indicated, it would be of relatively simple design and equally as effective as conventional drive shaft assemblies and universal joint designs. The invention combines the use of materials which in practice have proved successful when used independently. In the case of an assembly utilizing a tripod or ball type constant velocity universal joint, both parts not integral with the intermediate shaft may be of conventional materials such as steel or other metallic components. However, it would be within the scope of the invention for other parts of the universal joints to be made of fiber reinforced plastic material.

Thus, it will be seen that the invention enables a considerable saving in weight and a longer service life which, in the final analysis, will have a very positive effect on the overall weight of the vehicle.

While specific embodiments of the invention have been shown and described in detail to illustrate the application of the inventive principles, it will be understood that the invention may be embodied otherwise without departing from such principles.

What is claimed is:

1. A drive shaft assembly particularly for use for driving the wheels of a motor vehicle comprising a first universal joint, a second universal joint and an intermediate shaft interconnecting said two universal joints, said intermediate shaft being made exclusively of fiber reinforced plastic material and being structured integrally with a component of at least one of said universal joints, at least one of said universal joints consisting essentially of an outwardly extending fold formed in said intermediate shaft, said fold extending integrally with a connecting part adapted to enable said intermediate shaft to be joined with a driving member, said fold being formed with a diameter which is larger than the diameter of said intermediate shaft.

2. A drive shaft assembly particularly for use for driving the wheels of a motor vehicle comprising a first universal joint, a second universal joint and an intermediate shaft interconnecting said two universal joints, said intermediate shaft being made exclusively of fiber reinforced plastic material and being structured integrally with a component of at least one of said universal joints, at least one of said universal joints being a constant velocity ratio joint having a member which is formed integrally with said intermediate shaft, said integrally formed member having a diameter which is considerably larger than the diameter of said intermediate shaft but being formed with the same wall thickness as said intermediate shaft.

3. A drive shaft assembly particularly for use for driving the wheels of a motor vehicle comprising a first universal joint, a second universal joint and an intermediate shaft interconnecting said two universal joints, said intermediate shaft being made exclusively of fiber reinforced plastic material and being structured integrally with a component of at least one of said universal joints, at least one of said universal joints being a constant velocity ratio joint having a member formed integrally with said intermediate shaft, said at least one constant velocity ratio joint being a tripode joint having a tripod element with limbs connected at their outermost ends to said intermediate shaft.

4. A drive shaft assembly particularly for use for driving the wheels of a motor vehicle comprising a first universal joint, a second universal joint and an intermediate shaft interconnecting said two universal joints, said intermediate shaft being made exclusively of fiber reinforced plastic material and being structured integrally with a component of at least one of said universal joints, at least one of said universal joints being a constant velocity ratio joint having a member formed integrally with said intermediate shaft, said at least one constant velocity ratio universal joint comprising an outer joint member having internal grooves, wherein said intermediate shaft comprises an end portion having apertures therein and wherein a plurality of balls are provided received one in each of said grooves and occupying said apertures in said end portion of said intermediate shaft, said balls being supported against inward movement.

5. An assembly according to claim 4, further comprising a support member arranged inside said shaft end portion supporting said balls against inward movement.

6. An assembly according to claim 5, wherein said support member comprises a ring having an external surface which has a concave configuration as viewed in a longitudinal section.

7. An assembly according to claim 3, wherein the outermost ends of said limbs of said tripod element are received in apertures in said intermediate shaft.

8. An assembly according to claim 7, wherein said apertures are provided with metallic bushes which receive said ends of said limbs.

9. An assembly according to claim 1, wherein said fold extends into a connecting part formed with a tubular configuration having splines adapting said intermediate shaft to be connected with a driving member.

10. An assembly according to claim 1, wherein the other of said universal joints comprises a universal joint including an inner joint member and an outer joint member with torque transmitting balls engaged therebetween, said inner joint member being formed integrally with said intermediate shaft and having apertures therein within which said balls are received.

* * * * *